United States Patent [19]

Lukens et al.

[11] Patent Number: 4,599,505
[45] Date of Patent: Jul. 8, 1986

[54] FLEXIBLE TRAILING SHIELD FOR WELDING REACTIVE METALS

[75] Inventors: William E. Lukens; Robert DeNale, both of Annapolis, Md.

[73] Assignee: The United States of America as represented by the Secretary of the Navy, Washington, D.C.

[21] Appl. No.: 480,653

[22] Filed: Mar. 31, 1983

[51] Int. Cl.⁴ .................................................. B23K 9/16
[52] U.S. Cl. ........................................ 219/74; 219/136; 219/137.42
[58] Field of Search ....................... 219/136, 137.42, 74

[56] References Cited

U.S. PATENT DOCUMENTS

| | | | |
|---|---|---|---|
| 2,866,074 | 12/1958 | Ronay | 219/74 |
| 3,125,666 | 3/1964 | Gorman et al. | 219/74 |
| 3,309,496 | 3/1967 | Rosenberg | 219/74 |
| 3,875,364 | 4/1975 | Boyett | 219/136 |
| 4,078,167 | 3/1978 | Banas et al. | 219/121 R |
| 4,101,751 | 7/1978 | Urbanic et al. | 219/74 |

Primary Examiner—C. L. Albritton
Assistant Examiner—C. M. Sigda
Attorney, Agent, or Firm—Robert F. Beers; Luther A. Marsh; Christopher Philip Wrist

[57] ABSTRACT

A flexible trailing shield for providing nonreactive gas shielding to arc welding operations comprises a housing formed of interlocking transverse segments adapted to flexibly cover weld surfaces having varying configurations. The housing has a torch entrance port for slidably receiving a welding torch, a conduit for receiving gas into the housing, a foraminous material to uniformly distribute the gas within the housing, and a pervious structure through which the gas is dispersed over the weld surface.

3 Claims, 6 Drawing Figures

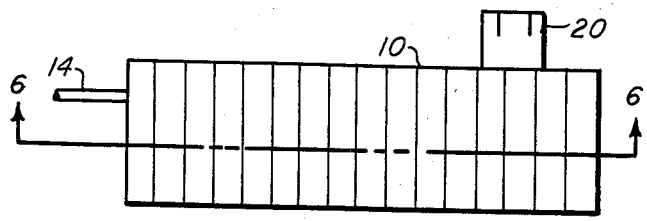
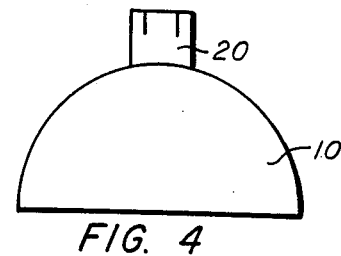
FIG. 1          FIG. 4
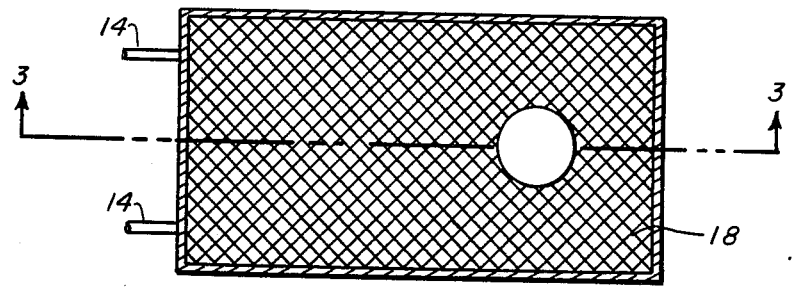
FIG. 2
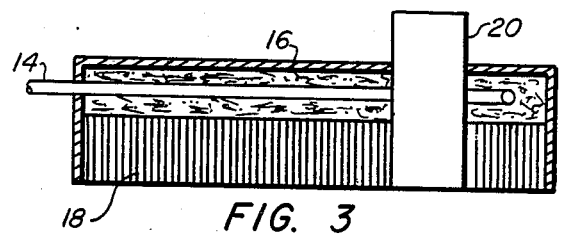
FIG. 3
FIG. 5
FIG. 6

FLEXIBLE TRAILING SHIELD FOR WELDING REACTIVE METALS

BACKGROUND OF THE INVENTION

The present invention relates to arc welding and more particularly to an apparatus for applying nonreactive gas to weld surfaces having varying configurations.

Reactive metals (i.e., titanium, zirconium, and hafnium) at elevated temperatures have high solubilities for oxygen, nitrogen, and hydrogen. The dissolution of relatively small amounts of these gases into the metals significantly affects the metals' physical properties. For example, the dissolution of oxygen and nitrogen significantly increase hardness while the dissolution of hydrogen reduces toughness and increases notch sensitivity.

Oxygen, nitrogen, and hydrogen are all present in the atmosphere. Therefore, when welding reactive metals it is critical to scrupulously shield from the atmosphere that portion of the reactive metal which would be at elevated temperatures (i.e., molten weld pool, hot solidified weld metal, and adjacent heat-affected zone). The shielding is normally accomplished by surrounding the area to be protected by a nonreactive gas such as argon or helium.

The shielding of the molten weld pool is conventionally provided by a torch shield. The torch shield is disposed at the terminus of the welding torch and consists of a cup open at one end through which an electrode protrudes. This shield advances in the direction of the welding and therefore does not shield either the solidified weld metal or the adjacent heat-affected zone. In order to protect this area, a trailing shield is employed. The conventional trailing shield consists of a rigid housing which is mounted to the welding torch and configured to provide effective shielding to a predetermined surface configuration.

Various problems exist with rigidly constructed trailing shields. For example, if the surface configuration changes or another workpiece of different configuration is to be welded, the trailing shield would have to be replaced with one adapted to the particular surface configuration. Similarly, if no trailing shield is available for a particular surface configuration, less than adequate shielding will be provided.

SUMMARY OF THE INVENTION

The present invention embodies a flexible trailing shield comprising a housing formed of interlocking transverse segments and capable of flexibly covering weld surfaces having varying configurations. Nonreactive gas is received into the housing and then uniformly dispersed upon the weld surface thereby providing effective gas shielding.

An object of the instant invention is to provide a trailing shield which does not have to be replaced during the welding of surfaces having varying configurations.

Another object is to provide effective gas shielding to particular surface configurations which would not otherwise be amenable to effective shielding.

A still further object is to provide a simple and cost effective trailing shield.

These and other objects and advantages of the present invention will become more fully apparent from the detailed description when taken in conjunction with the following drawings:

FIG. 1 depicts a side view of the invention;
FIG. 2 depicts a bottom view of the invention;
FIG. 3 depicts a cross-sectional view taken on line 3—3 of FIG. 2;
FIG. 4 depicts an end view of the invention;
FIG. 5 depicts a cross-section of the interlocking segments; and
FIG. 6 depicts a cross-sectional view taken on line 6—6 of FIG. 1.

DETAILED DESCRIPTION OF THE INVENTION

The shield as illustrated in FIGS. 1 to 5 inclusive comprehends a housing 10 with cooperating gas handling means. The gas handling means comprises a dispersion conduit 14 for delivering gas into the housing 10, foraminous material 16 for uniformly dispersing it therein, and a pervious structure 18 to direct the gas upon a weld surface.

The housing 10 has a torch entrance port 20 for slidably receiving and providing an airtight fit to a welding torch (not shown). The torch entrance port 20 is welded to the housing 10 to prevent the atmosphere and other contaminants from entering therein. The torch entrance port 20 is disposed partways from one end of the housing 10 and extends from the bottom of the housing 10 to a fixed distance from its top. The torch entrance port 20 terminates with a plurality of slots about its circumference. The slots are of such length and width so as to impart radial flexibility to its end. An appropriate clamping device (not shown) would be employed about the end of the conduit to provide the airtight fit with the torch.

The housing 10 is formed of interlocking segments which permit both convex and concave movement about its longitudinal axis. The segments are joined by overlapping the ends about each other as illustrated in FIG. 5. The housing 10 can be conveniently fabricated from commercially available conduit. The conduit is axially severed to produce at least one cross-sectionally hemispheric body as illustrated by the end view of FIG. 4. Hemispheric plates are then welded to the ends to form an essentially airtight enclosure.

In the design and fabrication of the housing 10, the determination of its particular length and width is dependent on the welding speed and the thermal properties of the material being welded. As the welding speed increases, the length of the weld area susceptible to contamination by the atmosphere increases. Thus, in order to ensure adequate gas coverage, the length of the housing 10 must be greater for relatively faster welding speeds. Similarly, materials having low thermal conductivities retain elevated temperatures longer than materials having high thermal conductivities and therefore require a comparatively longer and wider housing 10 for adequate gas coverage.

The gas dispersing conduit 14 is substantially U-shaped in configuration and is fixedly disposed within the housing 10 as illustrated in FIG. 6. Both ends of the conduit 14 extend partway through a side of the housing 10 and are adapted to connect to a remote gas supply (not shown). The conduit 14 is welded where it extends through the side of the housing 10 to prevent the atmosphere and other contaminants from entering therein. The conduit 14 extends around the torch entrance port 20 so that the dispersion of the gas will shield an area forward of the weld pool. A plurality of openings 15 are disposed along the upper surface of the conduit 14 to direct the gas to the top of the housing 10.

Foraminous material 16, such as stainless steel or bronze wool, is disposed within the housing 10 to facilitate the uniform distribution of the gas. As illustrated in FIG. 3, the foraminous material is connected to fill the inside of the housing 10 from an area immediately below the gas dispersion conduit 14 to the top of the housing 10.

A pervious structure 18 forms the base of the housing 10 and is contiguous therewith. It may be a honeycomb or other configuration which directs the gas to the weld area. The structure should be flexible so as to adapt to varied or complex configurations and it should be capable of withstanding elevated temperatures which are generated during welding.

In operation, nonreactive gas such as argon or helium from the remote gas supply enters the housing 10 through the gas dispersion conduit 14. The plurality of openings in the gas dispersion conduit 14 direct the gas through the foraminous material 16 to the top of the housing 10. The gas impinges upon the top of the housing 10 and returns through the foraminous material 16. The gas then exist through the pervious structure 18 thereby providing effective gas shielding to the area which is covered by the housing 10.

The flexible trailing shield provides effective nonreactive gas shielding to surfaces having varying configurations. It obviates the need to change the shield during the welding operation and affords shielding to configurations which would not otherwise be amenable to effective shielding.

Although the invention has been illustrated and described with the particular embodiments illustrated, it will be apparent to those skilled in the art that various changes may be made therein without departing from the spirit of the invention as set forth in the appended claims.

What is claimed is:

1. A flexible trailing shield for providing nonreactive gas shielding to arc welding operations comprising:
    a housing, formed of interlocking transverse segments adapted to flexibly cover weld surfaces having varying configurations, and having a torch entrance port for slidably receiving a welding torch, said torch entrance port being defined by a conduit disposed partways from an end of said housing and extending from the base of said housing to a fixed distance above its top; and,
    gas handling means for receiving nonreactive gas into said housing and uniformly dispersing the gas upon the weld surface.

2. A flexible trailing shield as claimed in claim 1, wherein the torch entrance port includes a means for providing an airtight fit with the welding torch.

3. A flexible trailing shield as claimed in claim 2, wherein said means for providing an airtight fit includes a plurality of slots about the circumference at one end of the torch entrance port.

* * * * *